United States Patent
Joshi et al.

(10) Patent No.: US 10,540,329 B2
(45) Date of Patent: Jan. 21, 2020

(54) DYNAMIC DATA PROTECTION AND DISTRIBUTION RESPONSIVE TO EXTERNAL INFORMATION SOURCES

(71) Applicant: DataDirect Networks, Inc., Chatsworth, CA (US)

(72) Inventors: Rajkumar Joshi, Simi Valley, CA (US); Dave Fellinger, Westlake Village, CA (US); Jean-Luc Chatelain, Atlanta, GA (US)

(73) Assignee: DataDirect Networks, Inc., Chatsworth, CA (US)

( * ) Notice: Subject to any disclaimer, the term of this patent is extended or adjusted under 35 U.S.C. 154(b) by 502 days.

(21) Appl. No.: 14/694,931

(22) Filed: Apr. 23, 2015

(65) Prior Publication Data

US 2016/0314118 A1    Oct. 27, 2016

(51) Int. Cl.
*G06F 16/178*    (2019.01)

(52) U.S. Cl.
CPC ................. *G06F 16/178* (2019.01)

(58) Field of Classification Search
CPC ........... G06F 17/30174; G06F 11/1464; G06F 16/178
USPC .................................................. 707/640, 747
See application file for complete search history.

(56) References Cited

U.S. PATENT DOCUMENTS

| | | | | |
|---|---|---|---|---|
| 6,370,547 B1 * | 4/2002 | Eftink | .................... | G06Q 10/06 707/999.01 |
| 7,716,180 B2 * | 5/2010 | Vermeulen | .......... | H04L 67/1097 707/626 |
| 9,069,930 B1 * | 6/2015 | Hart | ........................ | G06F 21/00 |
| 9,563,782 B1 * | 2/2017 | Brisebois | ................ | G06F 21/62 |
| 2003/0154238 A1 * | 8/2003 | Murphy | .................. | H04L 41/00 709/201 |
| 2005/0060403 A1 * | 3/2005 | Bernstein | ................ | H04L 29/06 709/224 |
| 2006/0156380 A1 * | 7/2006 | Gladstone | ............... | G06F 21/52 726/1 |
| 2007/0180490 A1 * | 8/2007 | Renzi | .................... | G06F 21/577 726/1 |
| 2007/0276926 A1 * | 11/2007 | LaJoie | ..................... | G06F 21/10 709/219 |
| 2009/0150405 A1 * | 6/2009 | Grouf | ................. | G06F 17/3005 707/999.01 |

(Continued)

*Primary Examiner* — Hicham Skhoun
(74) *Attorney, Agent, or Firm* — SoCal IP Law Group LLP; Mark A. Goldstein (57) ABSTRACT

Systems and methods for dynamic context based data protection and distribution are described herein. In the method data replication in a multi-zone storage system automatically changes based on historical storage trends and/or external information obtained from third party information sources, such as feeds, websites, news alerts, emergency alerts, weather alerts and databases. The methods include monitoring third party information sources and evaluating a correlation between event data from the third party information sources and key words that are user provided and/or system derived. A correlation between the event data and data storage history is evaluated. A storage policy is derived based on the results of the correlation evaluation(s). The derived storage policy and corresponding key words are stored in a database. Data is stored in storage arrays according to storage policies corresponding to the key words identified in the data.

19 Claims, 8 Drawing Sheets

(56) References Cited

U.S. PATENT DOCUMENTS

| | | | |
|---|---|---|---|
| 2009/0235150 A1* | 9/2009 | Berry | G06F 16/48 |
| | | | 715/205 |
| 2013/0346532 A1* | 12/2013 | D'Amato | G06F 3/067 |
| | | | 709/213 |
| 2014/0059017 A1* | 2/2014 | Chaney | G06F 16/284 |
| | | | 707/692 |
| 2014/0250121 A1* | 9/2014 | Kieselbach | G06F 17/30595 |
| | | | 707/736 |

* cited by examiner

DYNAMIC DATA PROTECTION AND DISTRIBUTION RESPONSIVE TO EXTERNAL INFORMATION SOURCES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data stored in a data storage system and a method for storing data in a data storage system that allows dynamic context-based data protection and distribution responsive to external information sources.

Description of the Related Art

A file system is used to store and organize computer data stored as electronic files. File systems allow files to be found, read, deleted, and otherwise accessed. File systems store files on one or more storage devices. File systems store files on storage media such as hard disk drives, magnetic tape and solid-state storage devices.

Various applications may store large numbers of documents, images, audio, videos and other data as objects using a distributed data storage system in which data is replicated and stored in multiple locations for resiliency.

Data distribution and replication is often achieved based on rules set by system administrators and implemented according to policies for data. It is the policies which dictate how and when data is distributed among storage devices in the storage system.

DETAILED DESCRIPTION

The systems and methods described herein provide for dynamic context-based data protection and distribution processes in which data replication in a multi-zone storage system automatically changes based on historical storage trends and/or external information obtained from third party information sources.

Environment

Figure 1:
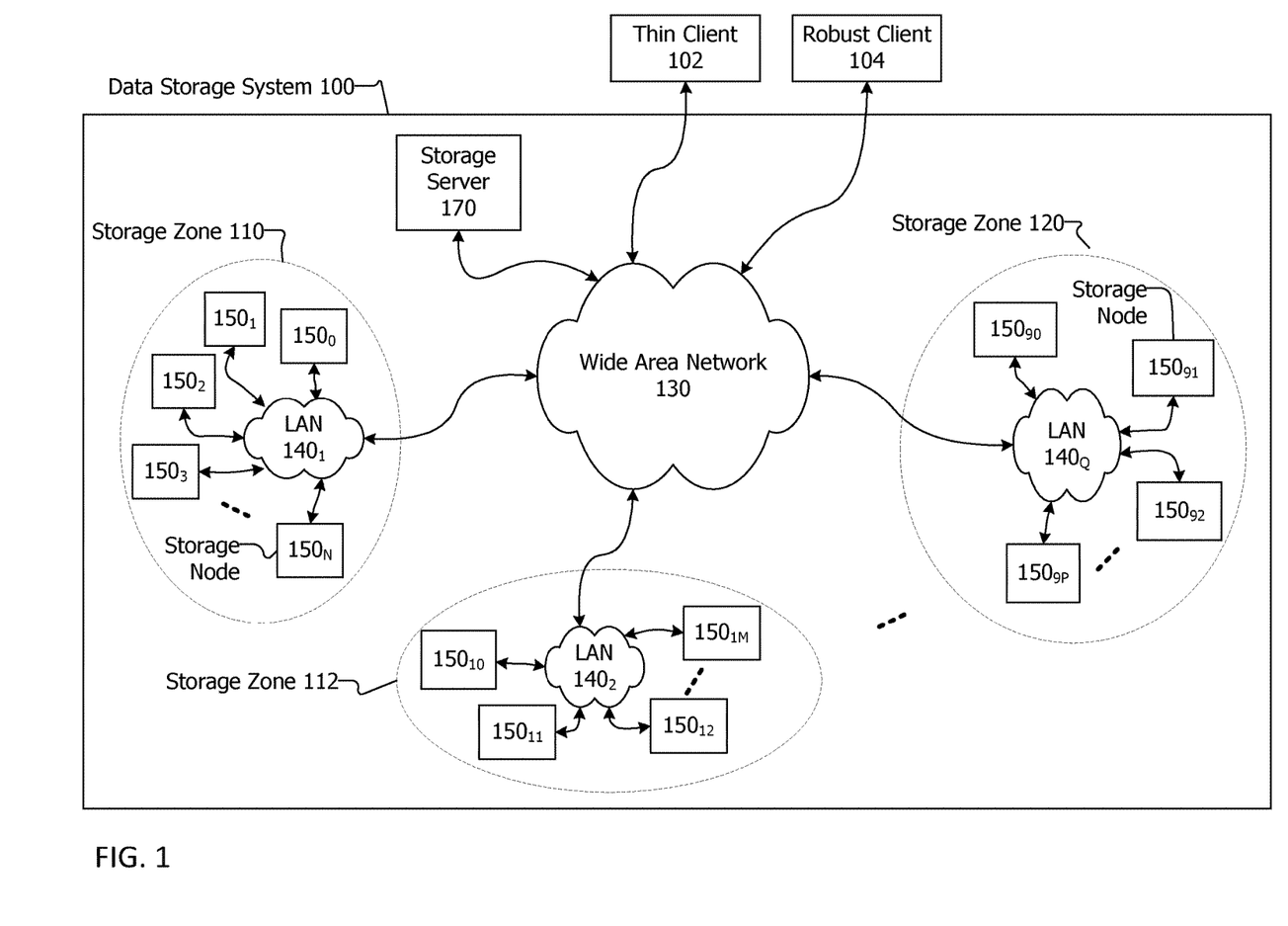
FIG. 1 is a block diagram of a data storage system.

FIG. 1 is a block diagram of a data storage system 100. The data storage system 100 includes at least two storage zones. The data storage system 100 typically includes multiple storage zones that are independent of one another. The storage zones may be autonomous. The storage zones may be in a peer-to-peer configuration. The storage zones may be geographically dispersed. In the example shown, the data storage system 100 includes three storage zones, first storage zone 110, second storage zone 112 and third storage zone 120. In other configurations, more than three storage zones are included in the data storage system. The storage zones may replicate data included in other storage zones. The data storage system 100 may be a distributed replicated data storage system.

The storage zones 110, 112 and 120 may be separated geographically, may be in separate states, may be in separate countries, may be in separate cities, may be in the same location, may be in separate racks, may be in separate buildings on a shared site, may be on separate floors of the same building, and arranged in other configurations. The storage zones 110, 112 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The data storage system 100 may include a storage server 170 coupled with wide area network 130. The storage server 170 may augment or enhance the capabilities and functionality of the data storage system by promulgating policies, receiving and distributing search requests, compiling and/or reporting search results, and tuning and maintaining the storage system. The storage server 170 may include and maintain an object database on a local storage device included in or coupled with the storage server 170. The object database may be indexed according to the object identifier or OIDs of the objects stored in the data storage system. In various embodiments, the object database may only store a small amount of information for each object or a larger amount of information. Pertinent to this patent is that the object database store policy information for objects. In one embodiment, the object database is an SQLITE® database. In other embodiments, the object database may be a MONGODB®, Voldemort, Cassandra or other key-value store. The objects and the object database may be referenced by object identifiers or OIDs like those shown in FIG. 3 and described below regarding FIG. 3.

The term data as used herein includes a bit, byte, word, block, stripe or other unit of information. In one embodiment, data is stored within and by the distributed replicated data storage system as objects. A data item may be stored as one object or multiple objects. That is, an object may be a data item or a portion of a data item. As used herein, the term data item is inclusive of entire computer readable files or portions of a computer readable file. The computer readable file may include or represent text, numbers, data, images, photographs, graphics, audio, video, raw data, scientific data, computer programs, computer source code, computer object code, executable computer code, and/or a combination of these and similar information.

Many data intensive applications store a large quantity of data; these applications include scientific applications, newspaper and magazine websites (for example, nytimes.com), scientific lab data capturing and analysis programs, video and film creation software, and consumer web based applications such as social networking websites (for example, FACEBOOK® and INSTAGRAM®), photo sharing websites (for example, FLICKR®), geo-location based and other information services such as NOW from Google Inc. and SIRI® from Apple Inc., video sharing websites (for example, YOUTUBE®) and music distribution websites (for example, ITUNES®).

Figure 2:
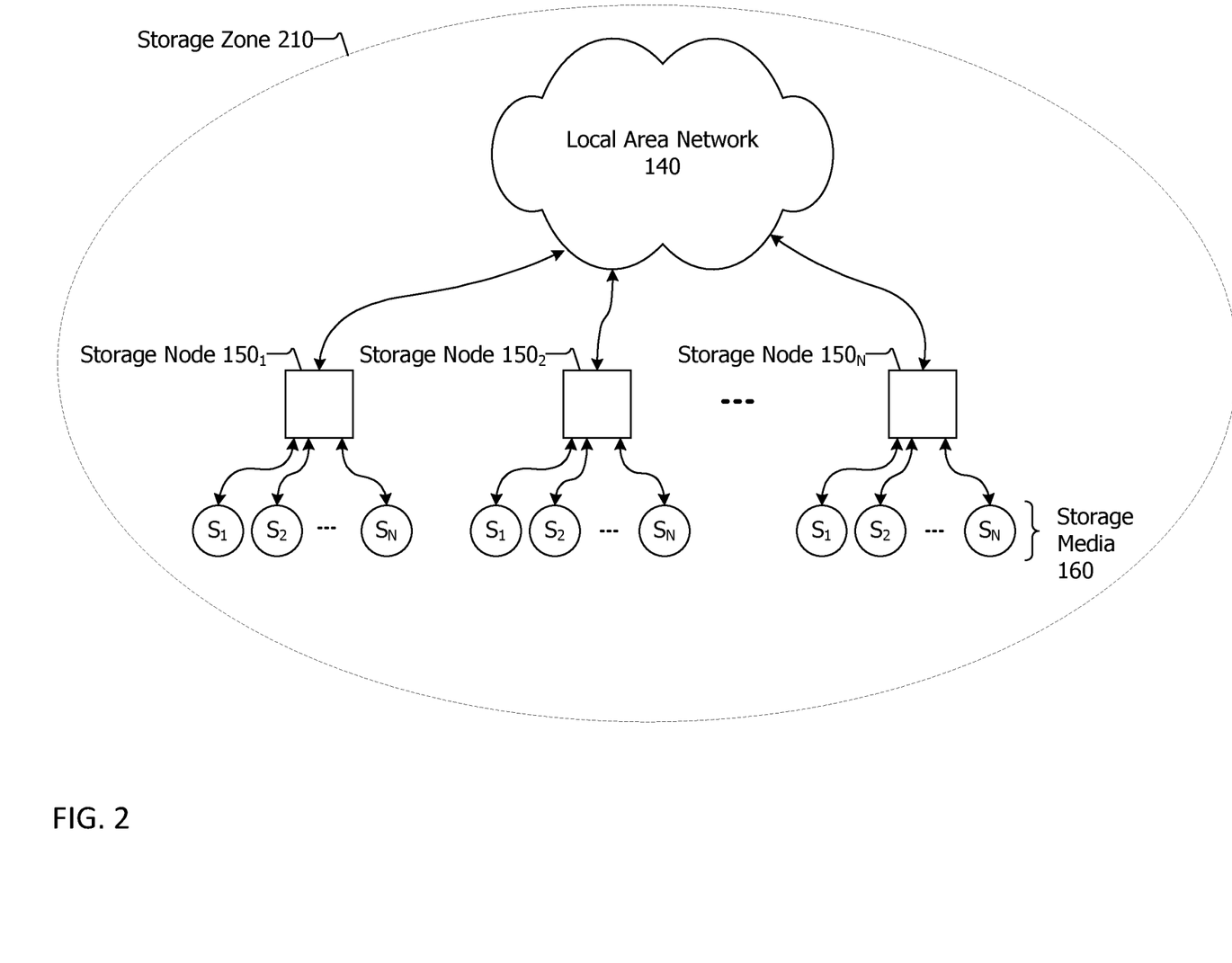
FIG. 2 is a block diagram of a storage zone included in a data storage system.

FIG. 2 is a block diagram of a storage zone 210 included in a data storage system. The storage zones 110, 112 and 120 shown in FIG. 1 are examples of storage zone 210. The storage nodes 150 within a storage zone 210 may be connected via a local area network 140 by wire lines, optical fiber cables, wireless communication connections, and others, and may be a combination of these. The local area network 140 may include one or more networking devices such as routers, hubs, switches and the like.

The storage zones 110, 112, 120 and 210 may include a computing device and/or a controller on which software may execute. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features described herein. The processes, functionality and features described herein may be embodied in whole or in part in software which operates on a controller and/or one or more computing devices in a storage zone, and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or computing device, and others by other controllers or computing devices within a storage zone.

A computing device as used herein refers to any device with a processor, memory and a storage device that may execute instructions such as software including, but not limited to, server computers, personal computers, portable computers, laptop computers, smart phones and tablet computers. Storage server 170 is, depending on the implementation, a specialized computing device or general purpose server computer. The computing devices run an operating system, including, for example, versions of the Linux, Unix, MICROSOFT® Windows, Solaris, Symbian, Android, Chrome, and APPLE® Mac OS X operating systems. Computing devices include a network interface in the form of a card, chip or chip set that allows for communication over a wired and/or wireless network. The network interface allows for communications according to various protocols and standards, including, for example, versions of Ethernet, INFINIBAND® network, Fibre Channel, and others. A computing device with a network interface is considered network capable.

Referring again to FIG. 2, the storage zone 210 includes a plurality of storage nodes 150 which include a plurality of storage media 160. Each of the storage nodes 150 may include one or more server computers. Each of the storage nodes 150 may be an independent network attached storage (NAS) device or system. The terms "storage media" and "storage device" are used herein to refer nonvolatile media and storage devices. Nonvolatile media and storage devices are media and devices that allow for retrieval of stored information after being powered down and then powered up. That is, nonvolatile media and storage devices do not lose stored information when powered down but maintain stored information when powered down. Storage media and devices refer to any configuration of hard disk drives (HDDs), solid-states drives (SSDs), silicon storage devices, magnetic tape, optical discs, nonvolatile RAM, carbon nanotube memory, ReRam memristors, and other similar nonvolatile storage media and devices. Storage devices and media include magnetic media and devices such as hard disks, hard disk drives, tape and tape players, flash memory and flash memory devices; silicon-based media; nonvolatile RAM including memristors, resistive random-access memory (ReRam), and nano-RAM (carbon nanotubes) and other kinds of NV-RAM; and optical disks and drives such as DVD, CD, and BLU-RAY® discs and players. Storage devices and storage media allow for reading data from and/or writing data to the storage device/storage medium. Hard disk drives, solid-states drives and/or other storage media 160 may be arranged in the storage nodes 150 according to any of a variety of techniques.

The storage media 160 included in a storage node 150 may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2 3 and 4 terabytes. Example hard disk drive specifications include Serial Attached Small Computer System Interface (SAS), Serial Advanced Technology Attachment (SATA), and others. An example storage node may include 16 three terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, other storage media, or a combination of these, and may also be the other storage media listed above. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In one embodiment, a controller for a node or a designated node, which may be called a primary node, may handle coordination and management of the storage zone. The coordination and management handled by the controller or primary node includes the distribution and promulgation of storage and replication policies. The controller or primary node may implement the adaptive replication processes described herein. The controller or primary node may communicate with a server, such as storage server 170, and maintain and provide local system health information to the requesting server.

In another embodiment, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane provide for and support 1, 2, 4, 8, 12, 16, 32, 48, 64, etc. network connections and may have an equal number of network interfaces to achieve this.

The techniques discussed herein are described with regard to storage media and storage devices including, but not limited to, hard disk drives, magnetic tape, optical discs, and solid-state drives. The techniques may be implemented with other readable and writable optical, magnetic and silicon-based storage media as well as other storage media and devices described herein.

In the data storage system 100, files and other data are stored as objects among multiple storage media 160 in storage nodes 150. Files and other data are partitioned into smaller portions referred to as objects. The objects are stored among multiple storage nodes 150 in a storage zone. In one embodiment, each object includes a storage policy identifier and a data portion. The object including its constituent data portion may be stored among storage nodes and storage zones according to the storage policy specified by the storage policy identifier included in the object. Various policies may be maintained and distributed or known to the nodes in all zones in the distributed data storage system 100. The policies may be stored on and distributed from a thin client 102 and/or a robust client 104 to the data storage system 100 and to all zones in the data storage system and to all nodes in the data storage system. The policies may be stored on and distributed from storage server 170 to the data storage system 100 and to all zones in the data storage system and to all nodes in the data storage system. The policies may be stored on and distributed from a primary node or controller in each storage zone in the data storage system. The policies may be stored by and distributed among one, some or all of thin client 102, robust client 104, storage server 170 and controllers within the storage zones.

As used herein, policies specify replication and placement for objects among the storage nodes and storage zones of the data storage system. In some versions of the system, the policies may specify additional features and components. The replication and placement policy defines the replication and placement of data objects in the data storage system. Example replication and placement policies include, full distribution, single copy, single copy to a specific zone, copy to all zones except a specified zone, copy to half of the zones, copy to zones in certain geographic area(s), copy to all zones except for zones in certain geographic area(s), and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies. The policy may be specified by a policy identifier stored as a byte or word, where a byte is 8 bits and where a word may be 16, 24, 32, 48, 64, 128, or other number of bits. The policy is included as a policy identifier in an object identifier shown in FIG. 3 as policy identifier 308 in object identifier 300. Storage policies may be predefined by the system upon initial configuration may be static, may be user specified upon initial installation, may be modified by users as needed, may be hard coded or unalterable, and may be derived, modified and altered with or without user intervention as described herein below and in FIGS. 6 and 7.

Referring again to FIG. 1, the client of the storage system 100 may be a computing device such as, for example, a thin client 102 such a personal computer, tablet, mobile phone, or workstation or server with limited performance capabilities and storage, or a robust client 104, such as, for example, a workstation or server with relatively large performance capabilities with large numbers of processors, memory and storage, and may be a group of computers or computing nodes arranged as a super computer. A robust client may have, for example 4, 8 10, 12 or more processors, gigabytes of RAM and terabytes or petabytes of non-volatile storage. In contrast, a thin client may be a mobile computing device such as a mobile phone or computing table or a standard personal computer, workstation or server with one processor, megabytes of RAM and gigabytes up to a few terabytes of storage. The wide area network 130 may connect geographically separated storage zones. Each of the storage zones includes a local area network 140.

The data storage systems and methods described herein may be useful in data storage systems with partial replication in which data is replicated in one or more additional storage zones in addition to an initial storage zone to provide a limited amount of redundancy such that access to data is possible when a zone goes down or is impaired or unreachable, without the need for full replication. The partial replication configuration does not require that each zone have a full copy of all data objects.

Replication may be performed synchronously, that is, completed before the write operation is acknowledged; asynchronously, that is, the replicas may be written before, after or during the write of the first copy; or a combination of each. A synchronous configuration provides for a resilient storage system. While synchronous replication provides for a high level of data resiliency, asynchronous replication provides for resiliency at a lower level. Asynchronous replication provides lower level of data protection until the background replication completes to satisfy specified or derived policy requirements. That is, in the case of asynchronous replication, the data resiliency is lower until the background replication completes. Once the asynchronous replication completes, the data storage system has the same redundancy as with synchronous replication. The dynamic context-based data protection and distribution methods described herein may be used in data storage systems configured both synchronously and asynchronously.

To facilitate the management and replication of objects in the data storage system, an object database on the storage server 170 may store information about each object. The object database may be indexed according to the object identifier or OIDs of the objects. The object database may be an SQLITE® database. In other embodiments the database may be, for example, a MONGODB®, Voldemort, Cassandra or other key-value store.

Figure 3:
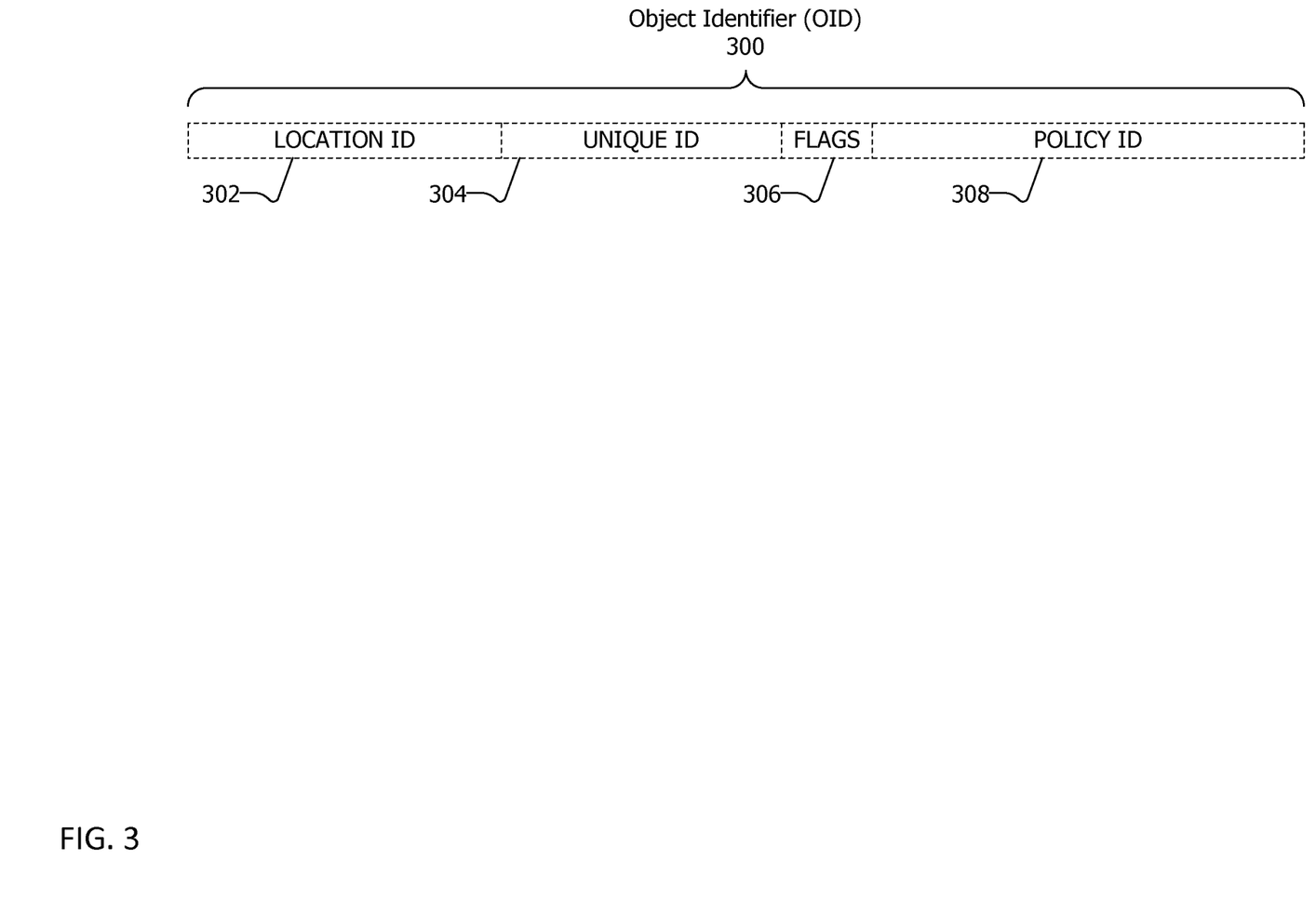
FIG. 3 is a block diagram of an object identifier (OID) for objects stored and managed by the data storage system.

The objects and the object database may be referenced by object identifier or OIDs like those shown and described regarding FIG. 3. Referring now to FIG. 3, a block diagram of an object identifier 300 used in the data storage system is shown. According to the data storage system described herein, an object identifier 300 includes four components and may include three or more components. The object identifier 300 includes a location identifier 302, a unique identifier 304, flags 306 and a policy identifier 308. The object identifier 300 may optionally include flags 306 and other fields. The location identifier 302 specifies a device, address, storage node or nodes where an object resides. The specific format of the location identifier may be system dependent.

In one version of the system, the location identifier 302 is 30 bits, but may be other sizes in other implementations, such as, for example, 24 bits, 32 bits, 48 bits, 64 bits, 128 bits, 256 bits, 512 bits, etc. In one version of the system, the location identifier 302 includes both a group identifier ("group ID") and an index. The group ID may represent a collection of objects stored under the same policy, and having the same searchable metadata fields; the group ID of the object becomes a reference for the embedded database of the object group. The group ID may be used to map the object to a particular storage node or storage device, such as a hard disk drive. The mapping may be stored in a mapping table maintained by the each of the zones of the object storage system. The mapping information is distributed and is hierarchical. More specifically, the system stores a portion of mapping information in memory, and the storage nodes hold a portion of the mapping information in their memory. Master copies of the mapping information are kept on disk or other nonvolatile storage medium on the storage nodes. The master copies of the mapping information are dynamically updated to be consistent with any changes made while the system is active. The index may be the specific location of the object within a zone. The index may refer to a specific location on disk or other storage device.

The unique identifier 304 is a unique number or alphanumeric sequence that is used to identify the object in the storage system. The unique identifier 304 may be randomly generated, may be the result of a hash function of the object itself (that is, the data or data portion), may be the result of a hash function on the metadata of the object, or may be created using another technique. In one embodiment, the unique identifier is assigned by the controller in the storage zones in such a manner that the storage device is used efficiently. The unique identifier 304 may be stored as 24 bits, 32 bits, 64 bits, 128 bits, 256 bits, 512 bits, 1 kilobyte, etc.

The object identifier 300 may optionally include flags 306. Flags 306 may be used to distinguish between different object types by providing additional characteristics or features of the object. The flags may be used by the data storage system to evaluate whether to retrieve or delete objects. In one embodiment, the flags associated with the object indicate if the object is to be preserved for specific periods of time, or to authenticate the client to ensure that there is sufficient permission to access the object. In one version of the system, the flags 306 portion of the OID 300 is 8 bits, but may be other sizes in other implementations, such as, for example, 16 bits, 32 bits, 48 bits, 64 bits, 128 bits, 256 bits, 512 bits, etc.

The policy identifier 308 is described above in para. [0034].

The total size of the object identifier may be, for example, 128 bits, 256 bits, 512 bits, 1 kilobyte, 4 kilobytes, etc. In one embodiment, the total size of the object identifier includes the sum of the sizes of the location identifier, unique identifier, flags, policy identifier, and version identifier. In other embodiments, the object identifier includes additional data that is used to obfuscate the true contents of the object identifier. In other embodiments, other kinds and formats of OIDs may be used.

In some embodiments, when the data objects are large, the data object may be partitioned into sub-objects. The flags 308 may be useful in the handling of large data objects and their constituent sub-objects. Similarly, the group ID may be included as part of the location ID 304, and may be used in mapping and reassembling the constituent parts of large data objects.

To facilitate the dynamic context-based data protection and distribution process in the data storage system, a policy database on a server, primary node or controller in each zone may store information about data and policies, particularly key words and designated policies and derived policies. The policy database may be indexed according to key words selected by a system administrator or other user or may be automatically generated by the system based on analysis of data storage history. The generation or derivation of key words and related policies is described in more detail below. The policy database is a key/value database. The policy database allows for if/then/that evaluations and conclusions. After creation, the policy database is continuously updated during ongoing data distribution to the storage system. The policy database may be an SQLITE® database. In other embodiments the database may be a MONGODB®, Voldemort, or other key-value store.

In one implementation, the key word policy database is maintained in conjunction with the robust client 104 and stored at and/or by the client. In one implementation of the storage system, the thin client 102 has very little involvement with the policy database and relies on the storage server 170, the storage zones and components of the system. In other implementations of the storage system, a robust client 104 maintains a full policy database while obtaining historical policy information and storage history information from the storage server 170 and the zones. The robust client 104 maintains the key word policy database in memory such as RAM so that is may be accessed quickly. Copies of the key word policy database may be regularly or occasionally made to permanent storage such as a hard disk or silicon storage device included with or coupled to the robust client 104, and backup copies may be stored as objects in the data storage system 100 to make the data storage system 100 resilient and robust so that it may recover from a power outage or other catastrophic failure or event.

The client, thin 102 or robust 104, is the first point of contact with data and initially ingests the data. In some configuration and some circumstances when the client is robust, the robust client 104 makes a storage policy decision according to the methods described herein. When the robust client 104 does this, the delay associated with one complete roundtrip with a zone or node is eliminated, resulting in increased performance in the form of quicker storage. For example, if data is being stored to the system, when the robust client 104 determines the storage location of the data based on the key word policy database that it locally stores, the delay in determining a storage policy is near zero. In this way, a robust client 104 virtually in the storage system 100 has certain advantages over a thing client 102 virtually external to the storage system. When the client, that is, the thin client 102, relies on a zone or node in the storage system to make the policy determination, network latency is incurred. The roundtrip time between the thin client and a zone or node could be in the order or few milliseconds to as much as a second or more. If the latency is incurred on a regular basis, the resulting delays may be too great for those installations of the storage system that require a higher level of performance. In this way, a robust client 104 provides advantages over a thin client 102.

Processes

Figure 4:
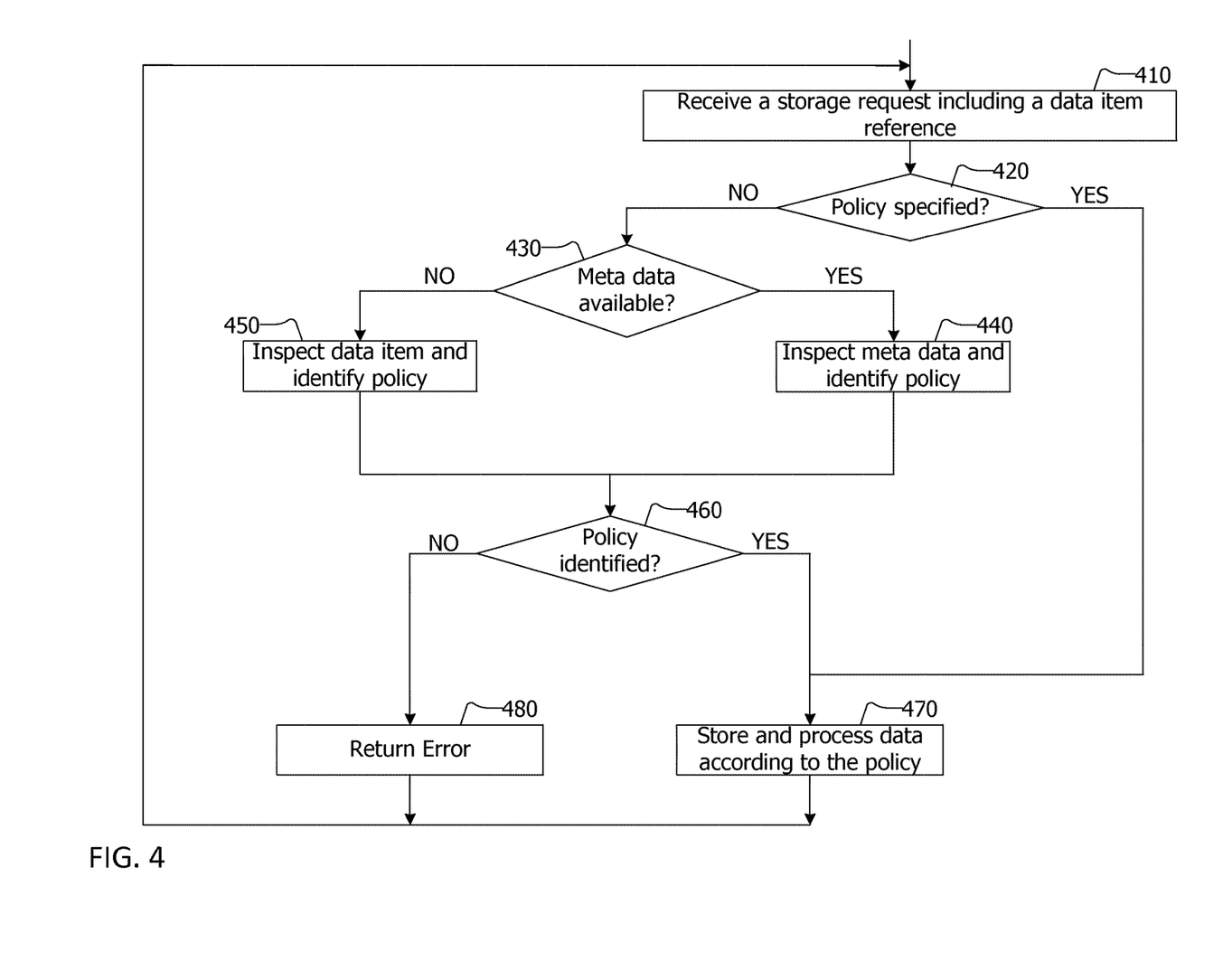
FIG. 4 is a flow chart of the actions taken to store or put data in a data storage system according to one version of a dynamic context-based data protection and distribution process.

The methods described herein may be performed by a robust client 104, the storage server 170 and/or a controller or primary node in a storage zone. Referring now to FIG. 4, there is shown a flow chart of the actions taken to store or put data in a data storage system according to one version of a dynamic context-based data protection and distribution process. A storage request including a data item reference is received, as shown in block 410. The storage request may include a policy identifier or descriptor. A check is made to evaluate whether a policy has been specified, as shown in block 420. If a policy has been specified, the data item is processed and stored according to the policy, as shown in block 470.

If no policy is specified in block 420, a check is made to learn if the data item referred to in the storage request includes meta data, as shown in block 430. As used herein, meta data includes information such as source IP address, destination IP address, author name, geographic location, recipient name, subject, company, or other information about the data item included with or appended to the data item. This is only a short example list of meta data that may be included with or appended to a data item. In some implementations for some kinds of objects there may be an external requirement that meta data be stored with object. For example, if a music file, such as, for example an MP3 file, ID3 tags may be stored internally with the audio recording while additional meta data about the recording may be stored separate and external from the recording. In this example, recording date, performing artist and other information may be included in the ID3 information included with the MP3 file while external meta data could be information about the recording device used to capture the MP3 or a personal designation such as "good for reading" or "great for running" or "recommended by Raj Joshi". This additional meta data may be included as a comment to the ID3 meta data or external, depending on the implementation. If there is meta data for the data item, the meta data is inspected and an attempt to identify a policy according to the meta data is made, as shown in block 440. The identification of a policy in block 440 is achieved by identifying key words in the meta data and referring to the policy database to retrieve the policy associated with the meta data key word. A check is made to evaluate whether a policy could be identified in the meta data, as shown in block 460. If a policy has been identified in block 460, the data item is processed and stored according to the policy, as shown in block 470. If no policy is identified in the meta data (blocks 440 and 460), an error is returned to the client who issued the storage request, as shown in block 480.

If there was no meta data available in block 430, the data item itself referred to in the storage request is inspected in an effort to identify a policy, as shown in block 450. Inspection of the data item itself may include character and text recognition of photographic and video images, facial recognition of photographic and video images, scanning for text strings (that is terms or words) included in the data item (particularly when the data item is in a text laden format such as an html file, word document file, email file, and the like), and others. This inspection is described in more detail below in para. [0055] If inspection of the data item to identify a policy is successful, as shown in block 460, the data item is processed and stored according to the policy, as shown in block 470. However, if inspection of the data item did not yield a policy (block 460), an error is returned to the client who issued the storage request, as shown in block 480.

Figure 5:
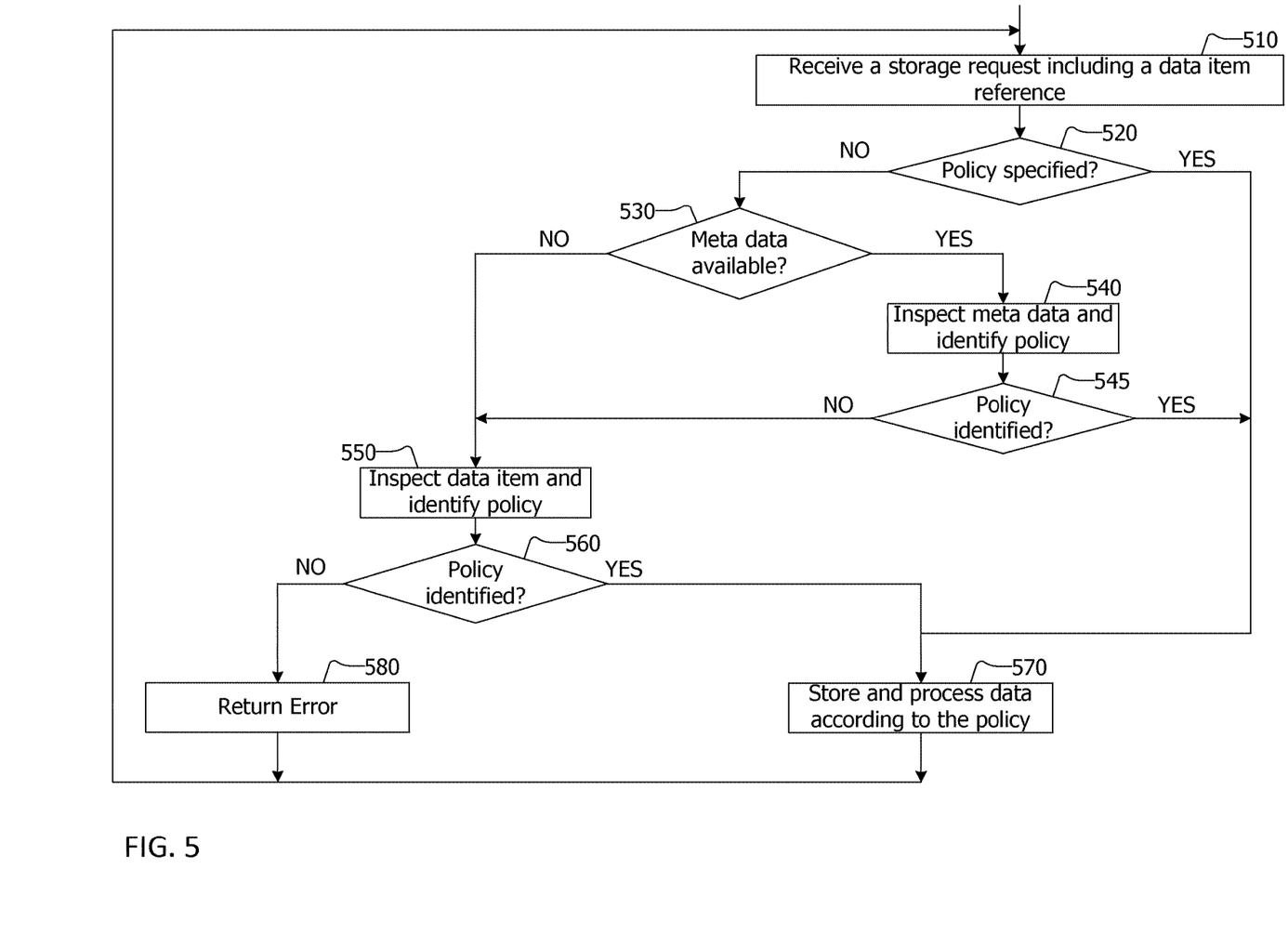
FIG. 5 is a flow chart of the actions taken to store or put data in a data storage system according to a second version of a dynamic context-based data protection and distribution process.

Referring now to FIG. 5, there is shown a flow chart of the actions taken to store or put data in a data storage system according to a second version of a dynamic context-based data protection and distribution process. A storage request including a data item reference is received, as shown in block 510. The storage request may include a policy identifier or descriptor. A check is made to evaluate whether a policy has been specified, as shown in block 520. If a policy has been specified, the data item is processed and stored according to the policy, as shown in block 570. If no policy is specified (block 520), a check is made to learn if the data item referred to in the storage request includes meta data, as shown in block 530. If there is meta data for the data item, the meta data is inspected and an attempt to identify a policy according to the meta data is made, as shown in block 540. The identification of a policy in block 540 is achieved by identifying key words in the meta data and referring to the policy database to retrieve the policy associated with the meta data key word. A check is made to evaluate whether a policy could be identified, as shown in block 545. If a policy has been identified (block 545), the data item is processed and stored according to the policy, as shown in block 570. If no policy is identified (block 545), the data item itself referred to in the storage request is inspected in an effort to identify a policy, as shown in block 550. The kinds of inspection and identifying are described below in para. [0055] If inspection of the data item to identify a policy is successful, as shown in block 560, the data item is processed and stored according to the policy, as shown in block 570. However, if a policy was not specified (block 520), if meta data was not available for the data item (block 530), and if inspection of the data item did not yield a policy (block 560), an error is returned to the client who issued the storage request, as shown in block 580.

The actions taken in FIGS. 4 and 5 as shown and described involving a data item may be applied to groups of objects in an object group. This increases the efficiency of object management. To achieve this, the actions shown in FIGS. 4 and 5 are taken upon groups of objects in an object group rather than single objects. In this way, when an object group could not be written according to a specified storage policy, all the storage synchronization of objects are handled as a group of objects in an object group. In this way, the system manages and stores all objects in the object group having a shared specified storage policy in a uniform way to reduce the amount of processing needed to handle the objects.

The actions taken in FIGS. 4 and 5 as shown and described above include inspecting data and meta data to identify a policy which determines how the data item will be stored. To achieve the actions in blocks 440, 450, 540 and 550, a policy database is consulted. To identify one or more applicable policies, the system inspects the data item and/or meta data to determine if any key words from the policy database are present in the data or meta data. This may be achieved by first seeking key words from the policy database in the data item and/or meta data. Alternatively, key words in the data and/or meta data may be identified and then the policy database may be searched for the identified key words. That is, the data item may be searched for the occurrence of already known key words. Further, key words in the data and/or meta data may be identified by propensity of use of non-ancillary terms. In addition, pertinent tags such as "subject", "time", "location", "mailto", "to", "from", "author", "address", "phone" and other data designations that may serve as telltales for key words. The identifying from blocks 450 and 550 may also be achieved by comparing portions of or the entirety of the data item with other data items which have policies to find a correspondence or match; and if a match is found, assuming the policy of the matching data item. Other methods and techniques may also be used.

Figure 6:
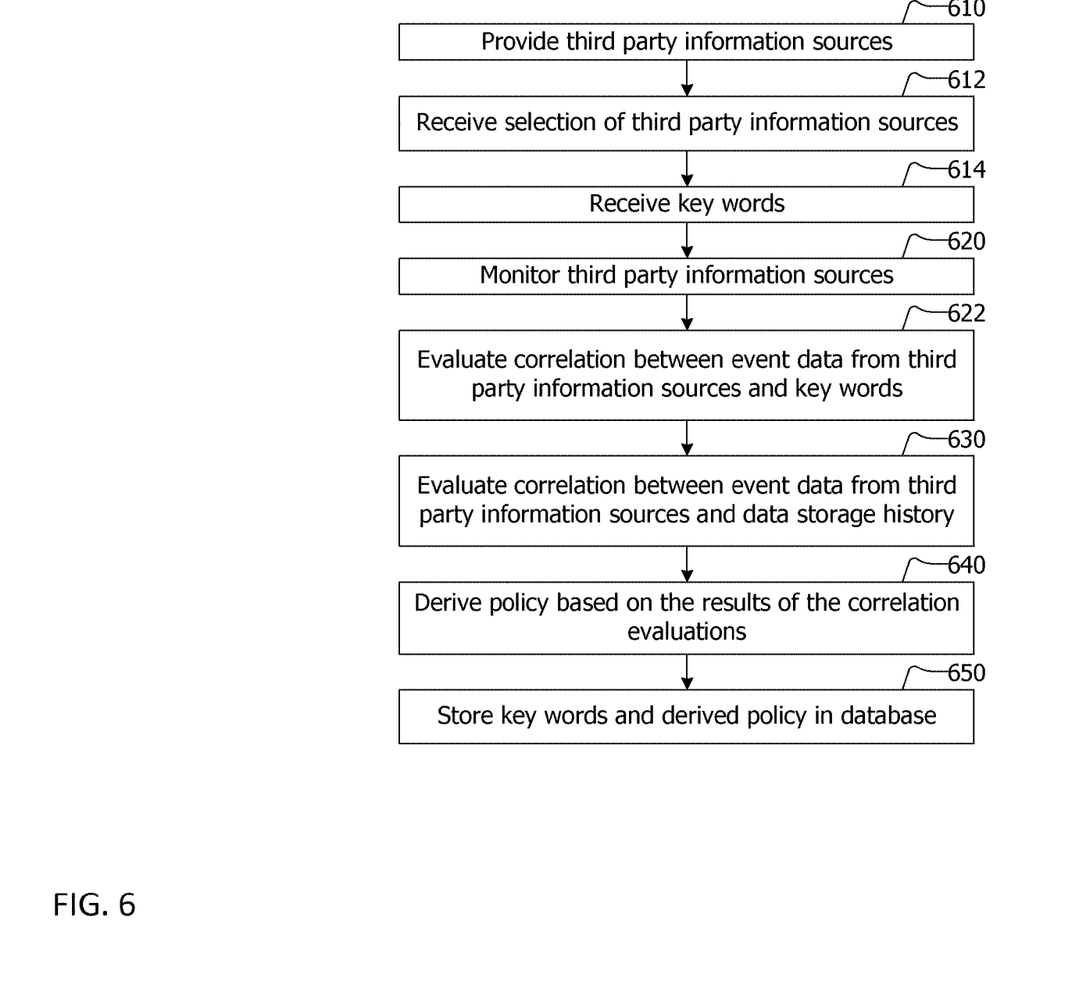
FIG. 6 is a flow chart of the actions taken to create a policy database according to one version of a dynamic context-based data protection and distribution process.

Referring now to FIG. 6, there is shown a flow chart of the actions taken to create a policy database according to one version of a dynamic context-based data protection and distribution process. In one embodiment the system may be preloaded with third party information sources which are provided to a user such as a system administrator. The third party information sources may include weather sources such as government weather and private weather feeds; emergency services feeds such as police and fire, military, and the like; early warning systems for environmental emergencies such as typhoons, tsunamis, earthquakes, hurricanes, and the like; media and entertainment websites and feeds providing information about events and happenings such as movie release dates, concert schedules, personal appearance schedules, role playing events; sports and team websites and feeds providing information about sports teams schedules, important games, important sporting events such as drafts, personal appearances; and others. Although not shown in the drawings, the system may provide for user specification of additional public or private third party information sources. Private third party information sources may include military information and feeds that provide information about military personnel assignment, military equipment assignments and allocations; entertainment production company information and feeds that provide movie production schedules, movie release schedules, product release schedules, surprise concert schedules, and others; scientific research equipment allocation and access schedules; and others. A selection and/or specification of third party information sources is received, as shown in block 612. In one embodiment the system receives user specified key words, as shown in block 614. In another embodiment, the system may alternatively or additionally have system provided key words. The system provided key words may be pre-selected prior to delivery; they could be generic and include certain weather conditions (for example, hurricane, tsunami, northeaster, etc.); or they may be specific to a known industry of the customer of the data storage system.

The system monitors third party information sources for the occurrence of key words, as shown in block 620. The system may evaluate the correlation between event data from third party information sources and key words, as shown in block 622. The event data includes information contained in feeds, websites, news alerts, emergency alerts, weather alerts, databases and other third party information sources stored or available in any of a variety of formats including text, RSS, HTML, and others. The third party information sources may be default system provided third party information sources and/or user selected third party information sources, and/or user specified third party information sources. The system may evaluate the correlation between event data from third party information sources and data storage history, as shown in block 630. The actions taken in blocks 622 and 630 may be taken concurrently, successively or alternatively. The third party information sources may be default system provided third party information sources and/or user selected third party information sources, and/or user specified third party information sources. The data storage history is maintained by the data storage system, and typically by one or more of the storage server, a robust client and a primary node.

The data storage history includes key words extrapolated based on internal telltales or frequently used terms. The data storage history includes a history of storage of data items and the corresponding meta data for the storage activity. The data storage history includes at least some of the following information: [1] kind information: the kind of data item being stored, which may be a code, for example, numeric, alphanumeric, and the like; a three letter common designation representing the data item type such as MP3, WAV, MP4, DOC, TXT, MSG, EML, PDF, JPG and the like; or plaint text such as music, video, text, data, image, photo, database, email document, and the like; [2] time and date information: representation of the time and day of the week the storage action occurred; [3] author information: author, creator or other identifying information such as human name, email address and associated server name, domain name, IP address and the like for the data item and included in the data item; [4] source information: originator, sender and other source identifying information such as human name, server name, email address, domain name, IP address zone name, system name and the like for the data item and included in the data item; [5] destination information: this include recipient human name, server name other source identifying information such as email address, domain name, IP address, zone name, system name and the like for the destination of the data item; [6] geographic information: geographic data for the data item, for the source of the data item, and for the storage destination of the data item; and [7] other meta data: this includes names, titles, descriptions included with and in the data item.

A policy is then derived based on the results of the correlation evaluations, as shown in block 640.

Certain information sources may be considered more reliable and/or more pertinent and/or more relevant. The system may apply weights to the information sources. The more reliable, pertinent and/or relevant information sources may be given a higher or greater weight. The system may use these weights when evaluating the correlation described in block 622 and block 630 and when deriving the policy in block 640. Those third party information sources assigned greater weights impact the deriving more than other third party information sources.

Figure 8:
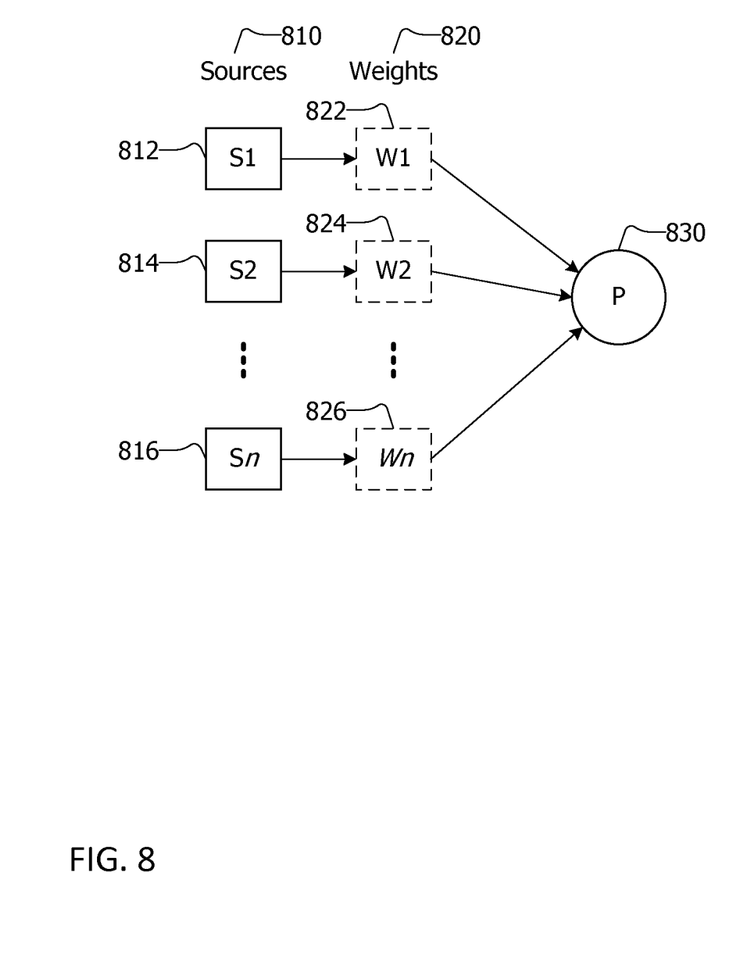
FIG. 8 is a block diagram showing the application of weights to information sources when creating a policy database.

The weighting of information sources is shown in the block diagram in FIG. 8. As shown in FIG. 8, weights 820 are applied to sources 810 when deriving the policies 830. Specifically, weights W1, W2 and Wn (822, 824 and 826) are applied respectively to sources S1, S2 and Sn (812, 814 and 816) to derive policy P (830).

The storage determination resulting in a policy derivation is stored in the policy database, as shown in block 640. It is this policy that is referred to by the methods described above regarding FIGS. 4 and 5.

Figure 7:
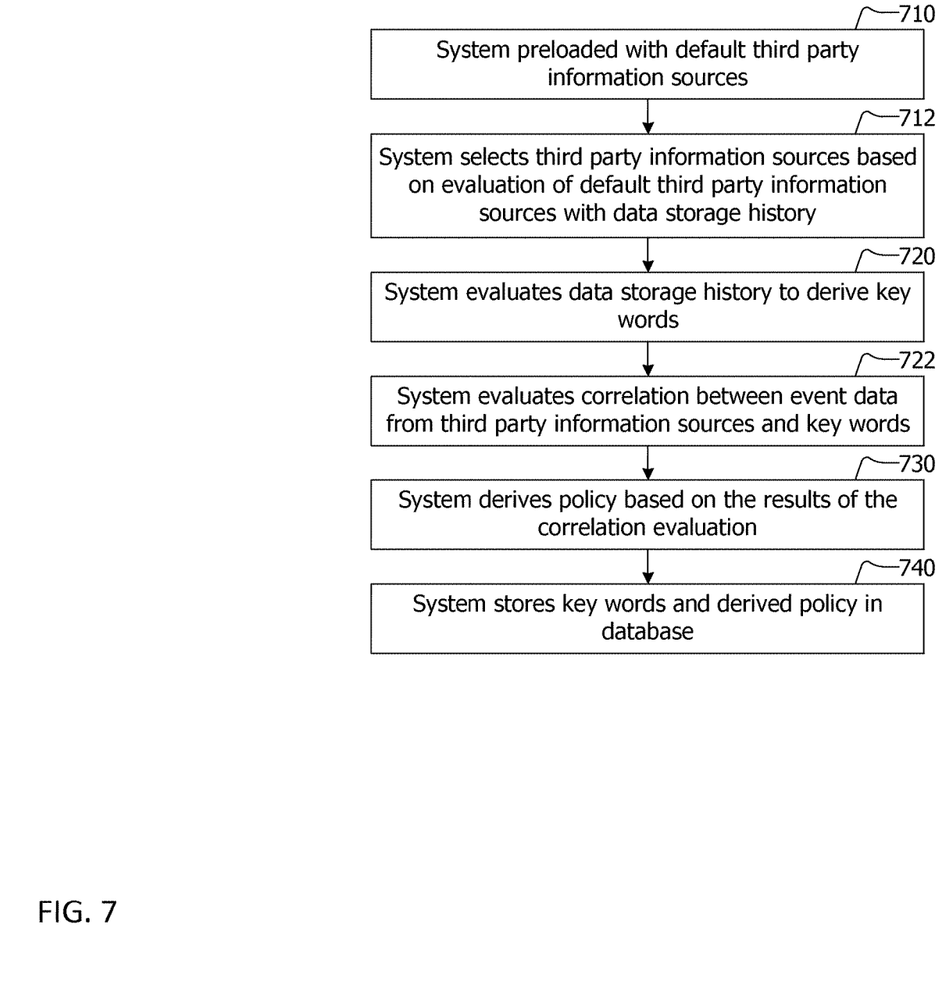
FIG. 7 is a flow chart of the actions taken to create a policy database according to a second version of a dynamic context-based data protection and distribution process.

Referring now to FIG. 7 there is shown a flow chart of the actions taken to create a policy database according to a second version of a dynamic context-based data protection and distribution process. This version is automated and requires no user intervention. The system may be preloaded with default third party information sources, as shown in block 710. The system may select third party information sources based on evaluation of default third party information sources with data storage history, as shown in block 712. The method may include one or both of the actions described in blocks 710 and 712. The system evaluates the data storage history to generate or derive key words, as shown in block 720. The system evaluates the correlation between event data from third party information sources and the key words, as shown in block 722. The system derives a policy based on the results of the correlation evaluation, as shown in block 730. The storage determination resulting in a policy derivation is stored in the policy database for reference by the methods described herein regarding FIGS. 4 and 5, as shown in block 740.

In addition, correlation of the information sources may be evaluated taking into consideration the extent to which the information source is reliable and/or pertinent and/or relevant. To achieve this, the system may apply weights to the information sources. The more reliable, pertinent and/or relevant information sources may be given a higher or greater weight. The system may use these weights when evaluating the correlation described in block 730 and when deriving the policy in block 740. The block diagram in shown in FIG. 8 and described above shows how weights may be applied to information sources.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A computing device to manage a plurality of storage arrays of storage devices, the computing device comprising:
   a processor;
   a memory coupled with the processor;
   a storage medium having instructions stored thereon which when executed cause the computing device to perform actions comprising:
     providing a list of third party information sources;
     receiving a selection of third party information sources;
     receiving user provided key words;
     monitoring third party information sources;
     evaluating a correlation between event data from third party information sources and key words;
     evaluating a correlation between event data from third party information sources and data storage history;
     deriving a storage policy based on the results of the correlation evaluations;
     storing the key words and the derived storage policy in a database;
     distributing the derived storage policy to the plurality of storage arrays,
   wherein the derived storage policy specifies replication and placement of data among the storage devices and the storage arrays
     storing data in the storage arrays including
       inspecting the data or meta data included with the data for the key words, including scanning text strings appearing in photographs and videos included in the data for the key words
       identifying the derived storage policy associated with the key words found in the data or the meta data of the data, including retrieving the derived storage policy from the database according to at least one of the key words found in the inspecting
       storing the data according to the derived storage policy identified with the key words.

2. The computing device of claim 1 wherein the deriving includes consideration and application of weights to the third party information sources such that some third party information sources impact the deriving more than other third party information sources.

3. The computing device of claim 1 wherein the third party information sources include at least one selected from the group including weather sources, emergency services feeds, early warning systems for environmental emergencies, media feeds and websites, entertainment feeds and websites, sports feeds and websites, and military information and feeds.

4. The computing device of claim 1 wherein the event data includes information from feeds, websites, databases, emergency alerts, weather alerts, news alerts at and/or from third party information sources.

5. The computing device of claim 1 wherein the data storage history includes at least three selected from the group including kind information, time and date information, author information, source information, destination information, geographic information.

6. The computing device of claim 1 wherein the database is a key-value store.

7. The computing device of claim 1 wherein the storage medium has further instructions stored thereon which when executed cause the computing device to perform further actions including evaluating the data storage history to derive additional key words, and wherein evaluating a correlation between event data from third party information sources and key words includes evaluating both user provided key words and the additional key words.

8. The computing device of claim 1 wherein evaluating a correlation between event data from third party information sources and key words includes applying weights to the third party information sources, the weights based on at least one selected from the group including reliability, pertinence and relevance of the third party information sources.

9. The computing device of claim 1 wherein the storage medium is one selected from the group including hard disk drives (HDDs), solid-states drives (SSDs), silicon storage devices, magnetic tape, optical discs, nonvolatile RAM, carbon nanotube memory, and ReRam memristors.

10. A computing device to manage a plurality of storage arrays of storage devices, the computing device comprising:
   a processor;
   a memory coupled with the processor;
   a storage medium having instructions stored thereon which when executed cause the computing device to perform actions comprising:
      preloading the computing device with a list of third party information sources;
      evaluating third party information sources in view of data storage history;
      evaluating data storage history to derive key words;
      monitoring third party information sources for occurrences of the key words;
      evaluating a correlation between event data from the third party information sources and the key words;
      deriving a storage policy based on the correlation evaluation;
      storing the key words and the derived storage policy in a database;
      distributing the derived storage policy to the plurality of storage arrays,
   wherein the derived storage policy specifies replication and placement of data among the storage devices and the storage arrays
      storing data in the storage arrays including
         inspecting the data or meta data included with the data for the key words, including scanning text strings appearing in photographs and videos included in the data for the key words
         identifying the derived storage policy associated with the key words found in the data or the meta data of the data, including retrieving the derived storage policy from the database according to at least one of the key words found in the inspecting
         storing the data according to the derived storage policy identified with the key words.

11. The computing device of claim 10 wherein the deriving includes consideration and application of weights to the third party information sources such that some third party information sources impact the deriving more than other third party information sources.

12. The computing device of claim 10 wherein the third party information sources include at least one selected from the group including weather sources, emergency services feeds, early warning systems for environmental emergencies, media feeds and websites, entertainment feeds and websites, sports feeds and websites, and military information and feeds.

13. The computing device of claim 10 wherein the event data includes information from feeds, websites, databases, emergency alerts, weather alerts, news alerts at and/or from third party information sources.

14. The computing device of claim 10 wherein the data storage history includes at least three selected from the group including kind information, time and date information, author information, source information, destination information, geographic information.

15. The computing device of claim 10 wherein the database is a key-value store.

16. The computing device of claim 10 wherein evaluating a correlation includes applying weights to the third party information sources, the weights based on at least one selected from the group including reliability, pertinence and relevance of the third party information sources.

17. The computing device of claim 10 wherein the storage medium has further instructions stored thereon which when executed cause the computing device to perform further actions including evaluating a correlation between event data from third party information sources and data storage history, and wherein the deriving is based on the evaluating third party information sources in view of data storage history and the evaluating a correlation between event data from third party information sources and data storage history.

18. The computing device of claim 10 wherein the storage medium has further instructions stored thereon which when executed cause the computing device to perform further actions including receiving user provided key words, and wherein evaluating a correlation between event data from third party information sources and key words includes evaluating user provided key words and derived key words.

19. The computing device of claim 10 wherein the storage medium is one selected from the group including hard disk drives (HDDs), solid-states drives (SSDs), silicon storage devices, magnetic tape, optical discs, nonvolatile RAM, carbon nanotube memory, and ReRam memristors.

* * * * *